Aug. 12, 1947.                G. H. BIDWELL                2,425,590
                          ELECTRIC FISHING FLOAT
                            Filed Aug. 11, 1945
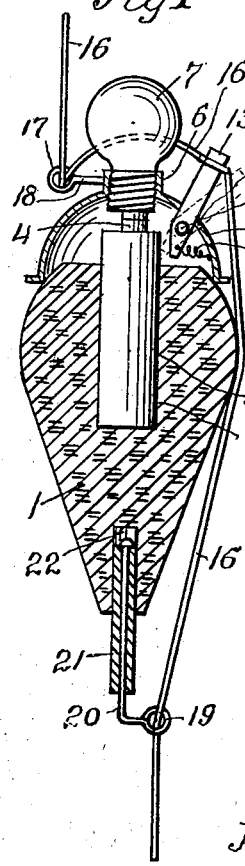
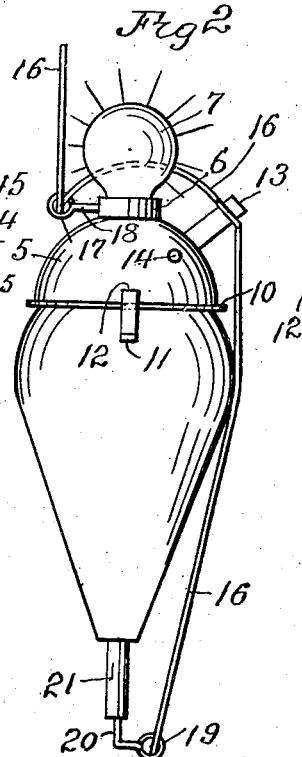
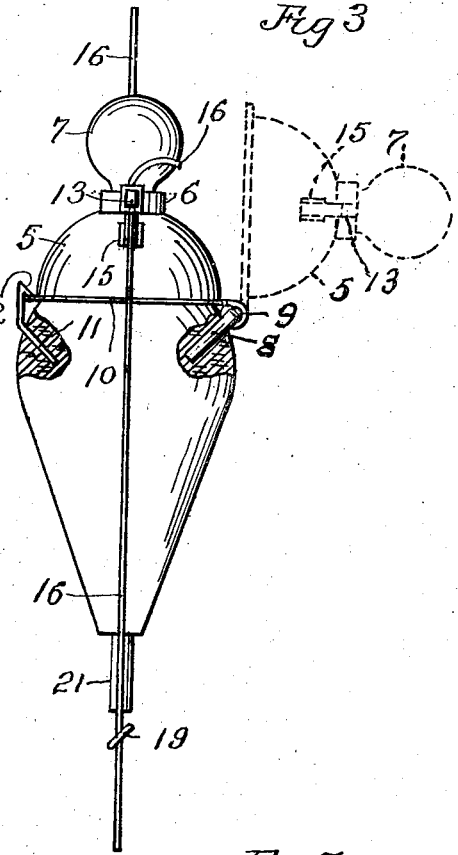
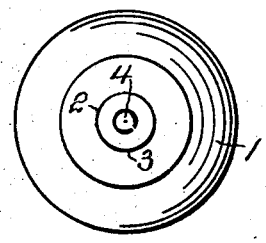
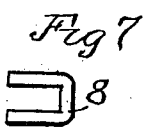
Inventor
George H. Bidwell
Warren D. House
By
His Attorney Patented Aug. 12, 1947

2,425,590

UNITED STATES PATENT OFFICE 2,425,590

ELECTRIC FISHING FLOAT

George H. Bidwell, Kansas City, Kans., assignor of one-half to Gervas E. Bellamy, Bethel, Kans.

Application August 11, 1945, Serial No. 610,311

2 Claims. (Cl. 43—17)

My invention relates to improvements in electric fishing floats.

It relates particularly to the type of electric fishing floats in which the float is provided with a battery cell and an electric lamp to be illuminated thereby when a fish pulls on a fishing line to which the float is attached.

One of the objects of my invention is the provision of novel means by which a normally open circuit in which the lamp and battery cell are located is closed so as to cause the lamp to illuminate when a fish exerts a sufficient downward pull on the fishing line.

A further object of my invention is the provision in a fishing float of the kind described of novel means for supporting the lamp and of opening and closing the circuit, which is simple, cheap to make, strong, durable, not likely to get out of order, and which is efficient in its operation.

The novel features of my invention are hereinafter fully described and claimed.

In the accompanying drawing, which illustrates a preferred embodiment of my invention, Fig. 1 is a side view of my improved float, shown partly in elevation and partly in vertical section, operatively attached to a fishing line, and showing the lamp supporting cap in its closed position with the lamp in closed engagement with the contact of the battery cell, the switch lever being shown in solid lines in its normal open circuit position and shown in dotted lines in closed engagement with the battery cell's periphery.

Fig. 2 is a side elevation of the float shown in Fig. 1, showing the switch lever in the closed position, as shown in dotted lines in Fig. 1, and a fish hook attached to the fishing line.

Fig. 3 is a side view, partly in elevation and partly broken away of the float shown in Figs. 1 and 2, but looking in a direction at right angles from that of Fig. 2, the cap being shown in solid lines in the closed position and in dotted lines in the open position.

Fig. 4 is a plan view of the battery cell mounted in the float body, the cap catch and hinge member being omitted.

Fig. 5 is a plan view of what is shown in solid lines in Fig. 3, the fishing line being omitted.

Fig. 6 is a perspective view of the cap catch member.

Fig. 7 is a plan view of the hinge member of the float body disposed flatwise.

Similar characters of reference designate similar parts in the different views.

1 designates the supporting float body, of buoyant material, preferably cork, as shown, and which is similar in form to an inverted pear and having a flat portion centrally at the top, in which flat portion is centrally provided a vertical recess 2 in which is adapted to be fitted a usual cylindrical battery cell having a conductive zinc peripheral wall 3, and having a contact 4 at its upper end.

The upper portion of the battery cell projects above the flat portion of the top of the float body 1, as shown in Fig. 1.

For normally covering the most of the upper end portion of the float body 1, and the battery cell, there is provided a semi-spherical hollow metal cap 5 having a central internally threaded socket 6, in which is removably fitted the threaded conductive lower end of an electric lamp having the usual bulb 7.

For hinging the cap 5 to the float body 1, so that the cap may be swung from the closed position, shown in Figs. 1, 2 and 3, to the open position, shown in dotted lines in Fig. 3, a U shaped hinge member 8 has its arms extending downwardly and inwardly into the float body 1 at one side of the upper end portion of the body, as shown in Fig. 3. The protruding upper transverse portion of the hinge member 8 is encircled by a protruding portion 9 of a circular flange 10 at the lower end of the cap 5, as shown in Figs. 3 and 5.

By means of this hinging of the cap 5 it can be swung from the closed position, shown in solid lines, to the open position shown in dotted lines in Fig. 3.

To releasably lock the cap 5 in the closed position, there is provided a catch member, Figs. 2, 3, 5 and 6, having its lower end portion 11 extending inwardly and downwardly into the float body 1 diametrically opposite to the hinge member 8. From the inclined portion 11 the catch member extends upwardly vertically past the flange 10 of the cap, and at its upper end has an inwardly extending lip 12 adapted to lockingly engage the flange 10 when the cap 5 is closed. The upper end of the catch slants inwardly, whereby the cap flange 10 can force the upper end of the catch member outwardly to permit the flange 10 to engage the under side of the lip 11, as shown in Fig. 3.

To close the circuit between the cap 5 and the peripheral wall 3 of the battery cell, a conductive metal switch lever 13 is pivoted on a metal pin 14 mounted transversely in the cap 5 at one side of the battery cell. The lever 13 extends through a slot 15 in the cap 5 and is pivoted on said pin 14 so as to swing from the normal open position, shown in solid lines in Fig. 1, to the dotted position, shown in Fig. 1 and in solid lines in Fig. 2.

When in the dotted position, shown in dotted lines in Fig. 1, and in solid lines in Fig. 2, the switch lever 13 will have its lower end strike the periphery 3 of the battery cell, thus closing the circuit through the bulb 7 of the lamp which will illuminate to notify the angler that a fish has exerted a downward pull on a fishing line 16, which is fastened to an eye 17 at the outer end of a pin 18 fastened at its inner end to the outer side of the socket 6.

From the pin 18 the fishing line 16 normally extends in slack form to the switch lever 13 to which it is rigidly fastened, and then extends downwardly alongside the float body 1 to and through an eye 19 at the lower end of a wire 20, the upper portion of which is mounted in a wooden pin having its upper end fastened in a central vertical recess, the pin being designated by 21 and the recess by 22.

The lower end of the fishing line 16 has fastened to it a usual bait hook 23. On the line between the hook 23 and the eye 19 is mounted a usual sinker weight 24, Fig. 2.

For normally swinging the switch lever 13 to and releasably holding it in the open circuit position, shown in solid lines in Fig. 1, a coil spring 25 is fastened at one end to the lever 13 below the pivot pin 14, and its other end is fastened to the inner side of the cap 5, as shown in Fig. 1.

In the operation of the float, the cap 5 is placed in its closed position in locked engagement with the catch member lip 12, as shown in Figs. 2 and 3. The switch lever 13 is held in the open position out of contact with the battery cell periphery 3 by the spring 25, as shown in Fig. 1.

When a fish bites the bait on the hook 23 and pulls downwardly on the fishing line 16, the line will pull downwardly on the switch lever 13, swinging the lever downwardly to the circuit closing position, shown in Fig. 2 and in dotted lines in Fig. 1.

The lamp bulb 7 will be illuminated notifying the angler of the strike, and he can then pull the fish from the water by withdrawing the fishing line 16 in the usual manner.

When a battery cell becomes exhausted, the angler can swing the cap 5 to the open position, shown in dotted lines in Fig. 3, withdraw the battery cell from the float body 1 and replace it with a fresh battery cell, after which by swinging the cap 5 to the closed position, and renewing the bait, if need be, the fishing line with its float may then be operated as has been described.

Many modifications of my invention, within the scope of the appended claims, may be made without departing from the spirit of my invention.

What I claim is:

1. In an electric fishing float, in combination with a buoyant supporting float body of nonconductive material having in its upper end a vertical recess, and a battery cell removably mounted in said recess and provided with a projecting upper end having a contact and a conductive periphery, of a hollow metal cap hinged at its periphery to said float body so as to swing to and from a closed position covering the upper end of said float body and having a side slot, and a central internally threaded socket, an electric lamp removably fitted in said socket and having at its lower end a contact in contact with said battery cell contact when said cap is in its closed position, means for releasably locking said cap in said closed position, means on the outer side of said cap for fastening thereto a fishing line, a metal lever conductively pivoted to said cap and extending through said slot and adapted to have fastened to its outer portion the fishing line, which, on a sufficient downward pull, will swing the inner portion of said lever into contact with said outer periphery of said battery cell to close the circuit and cause the lamp to illuminate, means normally yieldingly forcing said lever from contact with said battery cell so as to open the circuit, and means on said float body for slidingly guiding the fishing line downwardly from said lever.

2. In an electric fishing float, in combination with a buoyant supporting float body of nonconductive material having in its upper end a vertical recess, and a battery cell removably mounted in said recess with its upper end projecting therefrom and having a contact and a conductive periphery, of a hollow metal cap hinged at its periphery to the periphery of said float body so as to swing to and from a closed position covering the upper end of said float body, and having a central internally threaded socket, an electric lamp removably fitted in said socket and having at its lower end a contact in contact with said battery cell contact when said cap is closed, means for releasably locking said cap in the closed position, means on the outer side of said cap for fastening thereto a fishing line, and means attachable to the fishing line for closing the circuit between said cap and the periphery of said battery cell, to cause said lamp to illuminate when said cap is closed and a sufficient downward pull is exerted on said fishing line.

GEORGE H. BIDWELL.

REFERENCES CITED

The following references are of record in the file of this patent:

UNITED STATES PATENTS

| Number | Name | Date |
| --- | --- | --- |
| 989,145 | Hatchett | Apr. 11, 1911 |
| 1,518,425 | Haserodt | Dec. 9, 1924 |
| 1,707,901 | Bubb et al. | Apr. 2, 1929 |
| 1,917,707 | Gaede et al. | July 11, 1933 |